(12) United States Patent
D'Epiro (10) Patent No.: US 11,879,378 B2
(45) Date of Patent: Jan. 23, 2024

(54) SPARK IGNITION INTERNAL COMBUSTION ENGINE

(71) Applicant: FPT INDUSTRIAL S.P.A., Turin (IT)

(72) Inventor: Clino D'Epiro, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 17/793,663

(22) PCT Filed: Apr. 7, 2021

(86) PCT No.: PCT/IB2021/052881
§ 371 (c)(1),
(2) Date: Jul. 19, 2022

(87) PCT Pub. No.: WO2021/220086
PCT Pub. Date: Nov. 4, 2021

(65) Prior Publication Data
US 2023/0047309 A1 Feb. 16, 2023

(30) Foreign Application Priority Data
Apr. 29, 2020 (IT) .................... 102020000009403

(51) Int. Cl.
*F02B 19/12* (2006.01)
*F02B 25/02* (2006.01)
*F02M 21/02* (2006.01)

(52) U.S. Cl.
CPC .............. *F02B 19/12* (2013.01); *F02B 25/02* (2013.01); *F02M 21/0209* (2013.01); *F02M 21/0275* (2013.01)

(58) Field of Classification Search
CPC .......... F02B 19/04; F02B 19/12; F02B 25/02; F02M 21/0209; F02M 21/0275
See application file for complete search history.

(56) References Cited

U.S. PATENT DOCUMENTS

| 5,701,864 | A | * | 12/1997 | Tanigawa | F02B 25/14 |
| | | | | | 123/291 |
| 6,478,006 | B1 | * | 11/2002 | Hedelin | F02B 19/04 |
| | | | | | 123/285 |
| 2003/0041836 | A1 | * | 3/2003 | Roberts, Jr. | F02B 19/04 |
| | | | | | 123/279 |
| 2012/0240873 | A1 | * | 9/2012 | Ikeda | F02P 23/045 |
| | | | | | 123/3 |

(Continued)

FOREIGN PATENT DOCUMENTS

| DE | 572951 C | 3/1933 | |
| EP | 2060737 A1 | * 5/2009 | ................ F01B 7/18 |
| EP | 2060737 A1 | 5/2009 | |

*Primary Examiner* — Xiao En Mo
(74) *Attorney, Agent, or Firm* — Bayramoglu Law Offices LLC (57) ABSTRACT

An internal combustion engine with controlled ignition comprises a cylinder, a relative piston, and a head between which a combustion chamber is operationally defined. The cylinder and the piston define a first prismatic coupling. The engine also comprises a pre-chamber made directly inside the combustion chamber, and a male element stably connected to an upper surface of the piston to penetrate the pre-chamber at least in one portion of the relative motion of the piston in the cylinder. A spark plug is arranged to look out into the pre-chamber.

20 Claims, 5 Drawing Sheets

(56) References Cited

U.S. PATENT DOCUMENTS

| | | | | |
|---|---|---|---|---|
| 2014/0299108 | A1* | 10/2014 | Siuchta | F02B 19/04 |
| | | | | 123/48 AA |
| 2018/0283296 | A1* | 10/2018 | Nagatsu | F02D 13/0207 |
| 2018/0298848 | A1* | 10/2018 | Ulrey | F02D 41/3094 |
| 2019/0078499 | A1* | 3/2019 | Riley | F01L 21/02 |

* cited by examiner

SPARK IGNITION INTERNAL COMBUSTION ENGINE

CROSS REFERENCES TO THE RELATED APPLICATIONS

This application is a national phase of International Patent Application No. PCT/IB2021/052881 filed on Apr. 7, 2021, which claims priority based on Italian patent application 102020000009403 filed on Apr. 29, 2020. The disclosures of the applications are hereby incorporated by reference in their entireties.

TECHNICAL FIELD

The present invention relates to the field of controlled ignition internal combustion engines.

BACKGROUND

In the field of Diesel cycle internal combustion engines, the indirect injection of fuel in a so-called pre-combustion chamber is known.

The pre-chamber consists of a chamber directly and freely communicating with the combustion chamber, i.e. the chamber defined between the engine head and the upper surface of the piston that faces the head.

In this case we speak of "indirect injection" engines. This solution has been used in the past in the first automotive diesel applications, characterized by small displacement and high rotation speed compared to traditional heavy applications. This system promotes combustion by accelerating the mixing between the small quantities of injected diesel and the air.

Subsequently, also in the ignited combustion engines a real pre-chamber was introduced, intended as a portion, separated from the main combustion chamber, similar in layout to that of Diesel cycle engines, subdivided into active pre-chambers and passive pre-chambes.

In any case, the spark plug is located in the ignition pre-chamber.

The active pre-chamber involves the use of a fuel injector dedicated to the pre-chamber, to directly inject fuel into it. In some cases the active pre-chamber also includes an intake of air, forced or not. These technologies are widely used in F1 and are also being studied for production engines.

The passive pre-chamber, much simpler than the active pre-chambers, has been widely used in the engine sector in large-bore gas-powered engines, but lacking a dedicated injector and air intake port, it has been partially supplanted by direct injection as the washing of the pre-chamber is difficult and often impossible due to the minimum size of the passages between the pre-chamber and the main combustion chamber. This results in a high content of residual gases inside the pre-chamber exactly where the spark from the spark plug would require a stoichiometric or slightly rich mixture and free of any residual gases that slow down ignition. This negative effect is felt above all when it is planned to introduce exhaust gas recirculation known as EGR, as there is a risk of the mixture misfiring.

DE572951 and EP2060737 show two solutions in which a sort of pre-chamber is obtained in the head of a motor to form a cavity entirely inside the motor head.

The piston comprises a complementary portion with the cavity.

According to DE572951, this complementary portion is internally hollow with openings communicating with the dead volume of the combustion chamber.

According to EP2060737 the complementary portion is closed.

If not specifically excluded in the detailed description below, what is described in this chapter is to be considered as an integral part of the detailed description.

SUMMARY

The purpose of the present invention is to present a passive ignition pre-chamber capable of overcoming the problems of the known art.

The basic idea of the present invention is to make the pre-chamber, not outside the combustion chamber, but directly inside the combustion chamber in order to better expose it to the fresh air flows during the intake phase, obtaining an optimal washing temperature and its effective cooling.

In some operating conditions, the pre-chamber partitions, at least partially, a portion of the combustion chamber of the engine, while in other operating conditions, the pre-chamber is completely communicating with the remaining volume of the combustion chamber in which the pre-chamber is formed.

It can be expected that a portion of the pre-chamber is inside the head, but it is in any case a portion to be made a minority, compatibly with the dimensional requirements of the engine, with respect to the pre-chamber portion obtained from the volume of the combustion chamber.

More specifically, each cylinder/piston group defines two prismatic couplings, one in the other. It is known that a piston, also called male component, axially translates inside the relative cylinder, also called female component, having an internal cavity with a shape complementary to the male component. According to the present invention, the piston, in the upper surface comprises a male element, further than the piston itself, able to penetrate a cavity defining the pre-chamber, which is defined by a tubular longitudinal element, evidently formed by a perimeter wall, which from the engine head projects inside the combustion chamber, so that the male element penetrates the pre-chamber when the piston is proximal to the top dead center.

Contrary to the present configuration, DE572951 shows a pre-chamber obtained in a cavity of the head. Therefore, the pre-chamber of DE572951 does not project into the combustion chamber.

On the contrary, according to the present invention, the pre-chamber is defined by a tubular and longitudinal element which projects into the combustion chamber, that is towards the piston, defining a female element.

Therefore, the pre-chamber of the present invention is at least partially external with respect to the head.

Furthermore, the male element and the female element are coaxial and at least parallel with an axis of the cylinder/piston.

The fact that the tubular and longitudinal element protrudes into the combustion chamber implies that it comprises an internal surface intended to face the external surface of the male element when the piston is close to the top dead center, and an external surface intended to face towards the combustion chamber and optionally towards a cavity obtained in the piston head when the piston is close to the top dead center, at the base of which the male element is fixed. On the contrary, in DE572951 or EP2060737 being the pre-chamber defined by a cavity in the head, it has an internal surface, but not an external surface.

Furthermore, according to the present invention, the male element is devoid of cavities and/or openings towards the combustion chamber made in the relative body and preferably solid, contrary to what is shown in DE572951.

Well, none of DE572951 or EP2060737 can foresee that the pre-chamber has perimeter openings, as they would communicate with the inside of the head and not with the combustion chamber as foreseen by the present invention, as none of DE572951 or EP2060737 foresees that the pre-chamber is defined by a tubular element that projects into the combustion chamber.

In other words, it is, on the whole, two prismatic couplings, one in the other.

A main advantage is that, being the pre-chamber substantially or completely inside the combustion chamber, it exchanges a very limited heat with the external environment. This exchange is attributable to the conduction between the female element and the head or to the portion of the cavity directly obtained in the head, when the pre-chamber is partially even if minority defined in the head.

At least one spark plug overlooks the inside of the pre-chamber.

Evidently one could also think of a mechanical inversion in which the perimeter wall of the pre-chamber is in one piece with the piston rather than with the head and the male component, protrudes from the head so as to insert itself into the perimeter wall when the piston is proximal to the top dead center. Obviously, the male component in question must include the housing of the spark plug or be itself of an appropriate shape and size complementary to the pre-chamber.

The perimeter wall, that is the female element, includes side openings also called through openings arranged so as to remain crossable in any position of the male element. Preferably, the open end of the female element that defines the pre-chamber, has a tolerance with respect to the transverse dimensions of the male element such as to make a seal at least during the approaching movement of the piston to the top dead center.

Preferably, this tolerance is minimal compatibly with the play that exists between the piston and the relative cylinder and the thermal expansions.

This implies that the male element has the shape of a straight prism, preferably cylindrical in shape. Preferably, the pre-chamber also has the form of a solid of rotation and even more preferably cylindrical.

The upper surface of the piston is the one on which the pressure forces act the most during the ignition phase of the mixture, and is often referred to as the "crown".

The dependent claims describe preferred variants of the invention, forming an integral part of this description.

BRIEF DESCRIPTION OF THE DRAWINGS

Further objects and advantages of the present invention will become clear from the following detailed description of an example of its embodiment (and its variants) and from the attached drawings given purely for explanatory and non-limiting purposes, in which.

The same reference numbers and letters in the figures identify the same elements or components or functions.

In the context of this description, the term "second" component does not imply the presence of a "first" component. These terms are in fact used as labels to improve clarity and should not be understood in a limiting way.

The elements and features illustrated in the various preferred embodiments, including the drawings, can be combined with each other without however departing from the scope of this application as described below.

DETAILED DESCRIPTION OF THE EMBODIMENTS

Figure 1:
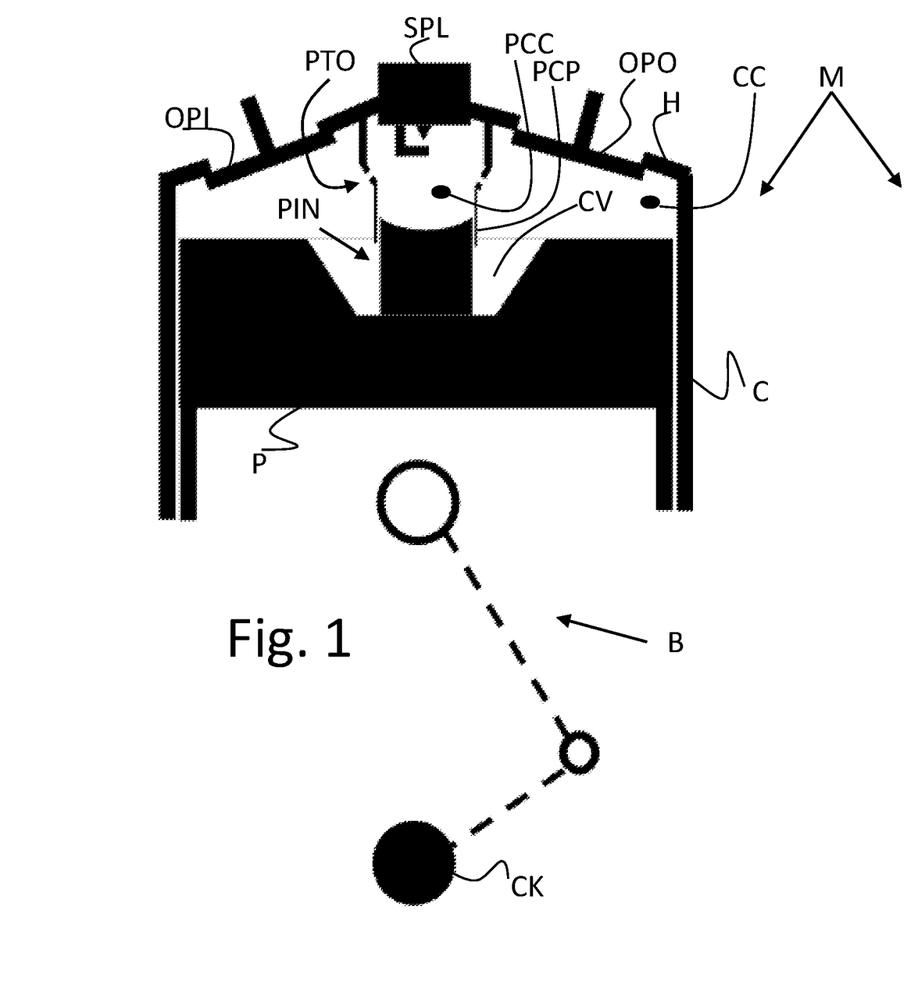
FIG. 1 shows an example of an internal combustion engine according to the present invention.

With reference to FIG. 1, an example of an internal combustion engine M according to the present invention is shown.

A cylinder C is schematized in which a piston P axially slides, operationally connected to a crankshaft CK by means of a crank mechanism B.

The combustion chamber CC is defined between the upper surface PS of the piston P, the cylinder C and the head H which closes the cylinder.

One or more openings and associated OPI, OPO valves are obtained in the head, respectively, for the intake and exhaust respectively of a fresh mixture and exhausted gases.

For example, two poppet valves known per se are shown.

A spark plug SPL overlooks the combustion chamber CC through the head T.

According to the present invention, a pre-chamber PCC is made inside the combustion chamber CC.

The pre-chamber includes a PCP perimeter wall, which projects from the engine head H into the combustion chamber, i.e. towards the piston.

The perimeter wall has a longitudinal tubular shape, with one end, called base, in one piece with the head H and an opposite end, free and facing the piston.

The upper surface PS of the piston P comprises a male element PIN having a longitudinal shape shaped so as to be able to penetrate the perimeter wall defining the pre-chamber PCC during the motion of the piston P, in the relative cylinder C, towards the top dead center, generally called TDC.

Therefore, the piston P coupled to the relative cylinder defines a first prismatic coupling. The PIN, in one piece and emerging from the upper surface PS of the piston, coupled to the pre-chamber PCC defines a second prismatic coupling.

It is worth highlighting that the tubular element defining the pre-chamber, projecting into the combustion chamber, can possibly be inserted into a groove CV annular with respect to the PIN and arranged between the pin and the piston head if the distance between the piston crown and the combustion chamber was not sufficient to allow an adequate pre-chamber volume.

The same configuration can also be seen in the following way:
  the piston head includes a blind cavity CV, at the base of which is fixed the pin that projects into the combustion chamber approximately according to the axis of the cylinder,
  between the pin and the blind cavity an annular groove is optionally defined to accommodate the tubular element that defines the pre-chamber.

Evidently the PIN development axis is coaxial with the pre-chamber development axis, defined by the aforementioned lateral surface.

Preferably, the PIN development axis coincides with the piston axis.

It is known that the piston generally has a cylindrical shape, that is a solid of rotation that expresses its own axis along which the same piston is able to move in the usual reciprocating motion. An optimal configuration requires that the development axis of the PIN coincides with the axis of the piston, but this is not essential.

The SPL spark plug is arranged so as to face into the pre-chamber, moreover, the pre-chamber includes PTO through openings in the lateral surface to allow both the washing of the pre-chamber itself and the propagation of the flame front, in the form of incandescent gas jets, during the combustion.

The axial extension of the pre-chamber, of the PIN and the stroke of the piston P are interrelated.

Obviously, the PIN is sized so as not to impact, at the top dead center, with the head and any component that projects from it into the pre-chamber, such as the spark plug.

Preferably the angular arc in which the PIN is inside the pre-chamber goes from −40° bTDCF (before the top dead center) to +40° aTDCF (after the top dead center), i.e. around 80 degrees around the point dead top. This value is intended as indicative and not limiting as it depends on the combustion speed of which the pre-chamber is only one of the influencing components. This angle can therefore vary from engine to engine and its optimization must be done on the bench.

Preferably, when the piston is at the relative bottom dead center BDC (Bottom dead center), the PIN is completely extracted from the combustion pre-chamber. This advantageously eliminates all the fluid dynamic losses normally present in traditional pre-chambers, and related to gases crossing the narrow perimeter through openings PTO, which in traditional pre-chambers are the only openings present.

Thanks to the present invention, the PIN is internal to the pre-chamber, and therefore makes a seal with it, only when it is necessary, that is to say when it is desired to pre-compress the mixture to exploit its subsequent violent propagation with flame front and when it is desired to carry out the washing of the pre-chamber.

As described herein, it is understood that the pre-chamber described here is of the passive type, as there is no fuel injector or an inlet port for fresh air from the outside.

In fact, the mixture that enters the pre-chamber does so by going through the combustion chamber, that is, indirectly.

Operation

Figure 2:
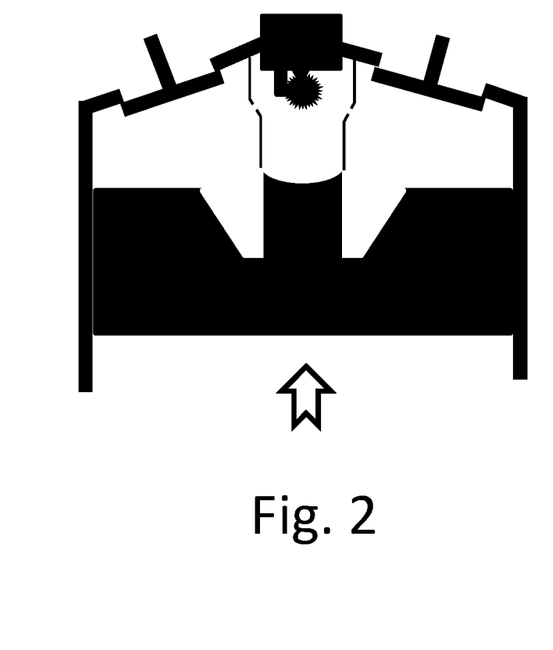
FIGS. 2-8 show different operating phases of the engine of FIG. 1.

FIG. 2 shows a compression condition of the mixture. Obviously the OPI and OPO valves are closed. The piston P is moving towards the top dead center and the spark plug is about to carry out a first ignition. According to a preferred configuration, the through openings PTO and the seal formed between the pre-chamber and the PIN are such that the pressure in the pre-chamber is greater than the pressure in the remaining combustion chamber CC.

Figure 3:
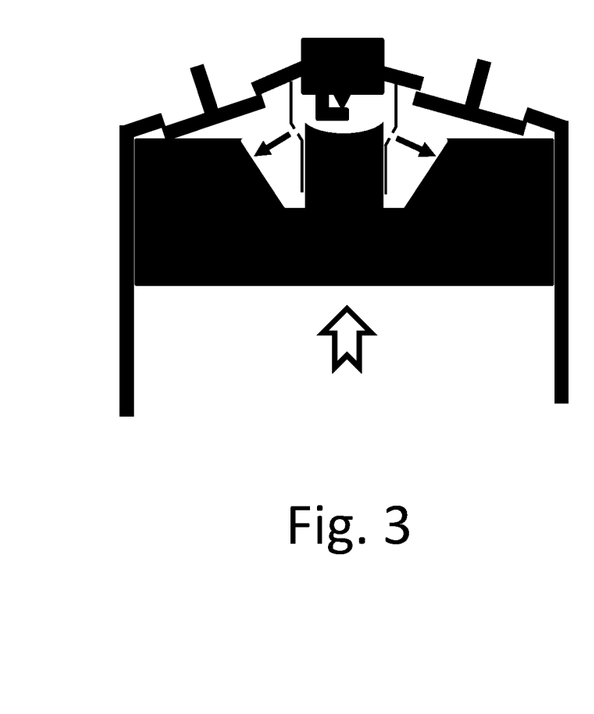

FIG. 3 shows the peak of the compression phase with the piston reaching the top dead center. The flame front caused by the first ignition determines an overpressure in the combustion pre-chamber PCC which leads to a flow of gas and flame to propagate violently through the openings PTO in the perimeter direction and preferably directed so as to cause ignition at half the distance between the center of the combustion chamber and the cylinder wall. This advantageously allows to minimize the total combustion time by reducing the total path that the flame has to travel.

It should be noted that the PIN and the PCP side wall that defines the pre-chamber are configured so as not to occlude the PTO through openings even at the top dead center. For this purpose, in the example of FIGS. 1-8, the pre-chamber forms an ampoule at the base, i.e. near the head, in order to allow the spacing of the inner face of the perimeter wall with respect to the free end of the PIN. Further details will be described below.

Figure 4:
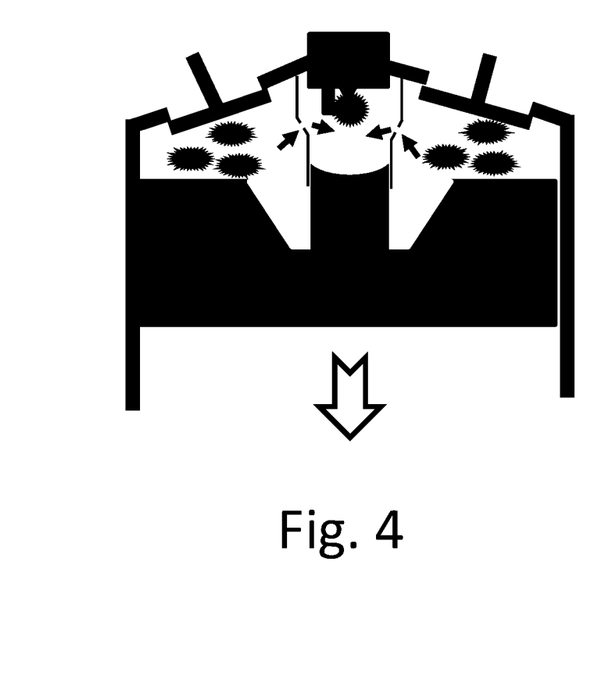

FIG. 4 shows, during the expansion phase, a partial removal of the piston from the top dead center. By virtue of the flame front propagation delay to the remaining combustion chamber, this movement of the piston determines a flow of unburned gas aspirated from the immediate vicinity of the pre-chamber wall which penetrates into the pre-chamber from the remaining combustion chamber. In at least a predetermined point of the piston stroke between the top dead center and the bottom dead center, the spark plug can carry out at least one further ignition of the mixture.

In other words, the present configuration can operate as a multi-spark thanks to the fluid dynamics triggered in the chamber and pre-chamber.

It is clear that the times for further ignitions must take into account the propagation of pressure waves inside the combustion chamber and the size of the through openings PTO.

Figure 5:
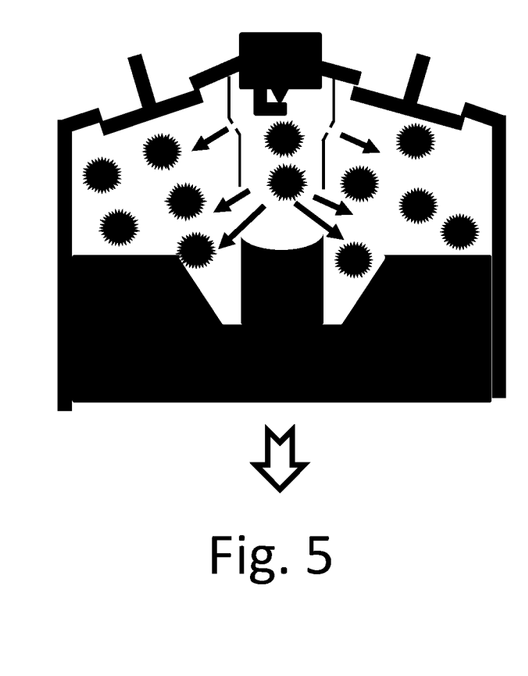

FIG. 5 shows the approach, by the piston, of the lower dead center. In this condition, the pre-chamber is maximally communicating with the remaining combustion chamber and the pressure is uniform within it.

Figure 6:
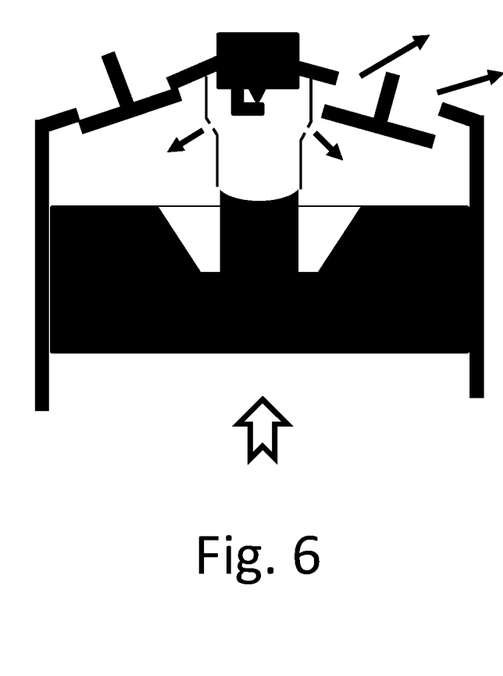

FIG. 6 shows the cylinder washing phase, in which the piston moves towards top dead center while the exhaust valve OPO is open.

In these conditions, the pressure inside the combustion chamber is lower than the pressure in the pre-chamber, as the exhaust valve is open, therefore a flow of exhaust gas is generated which from the pre-chamber reaches the chamber through the openings PTO thanks also to the expulsion action operated by the PIN.

Figure 7:
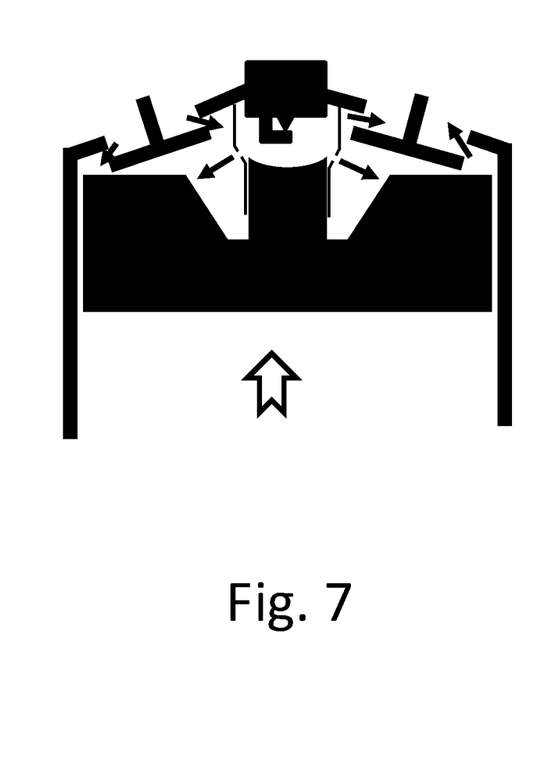

FIG. 7 shows the so-called crossing of the valves, that is, in a condition in which the piston is close to the top dead center, both the intake and exhaust valves are open, thus realizing the so-called "scavenging", i.e. an optimal washing of the chamber combustion. In these circumstances, since both valves are open, the pressure inside the pre-chamber is greater than in the rest of the combustion chamber, therefore, a flow of gas is generated towards the outside of the pre-chamber, promptly washed by the scavenging just described.

Figure 8:
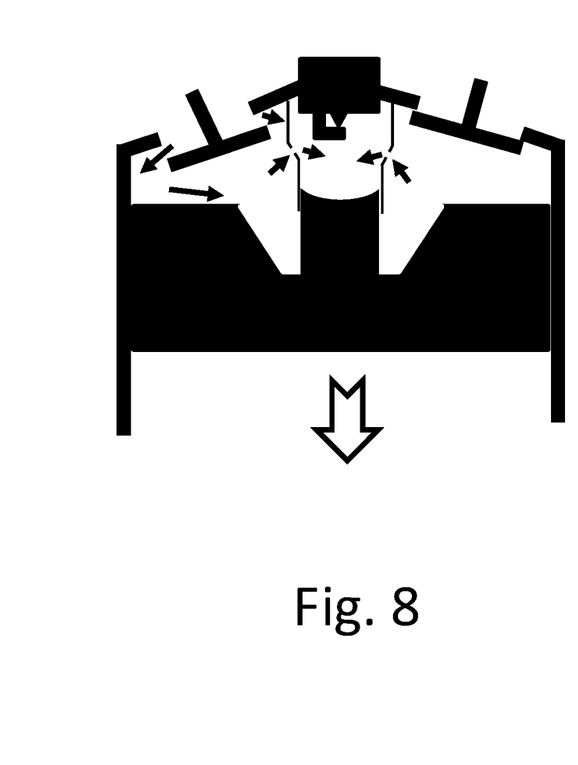

FIG. 8 shows the intake phase in which the discharge valve is completely closed, while the intake valve is open.

In these circumstances, the pressure inside the combustion chamber is greater than the pressure in the pre-chamber, due to the throttling caused by the through openings PTO and the descent of the PIN which generates a suction effect, therefore a flow of fresh air is generated, which washes the pre-chamber, coming from the remaining combustion chamber CC.

As highlighted, the present invention allows to have an optimal washing of the pre-chamber without needing it to be active.

Furthermore, according to a preferred variant of the present invention, the spark plug can be activated more than once, obtaining the same benefits as engines equipped with double spark plugs.

With reference to the previous figures, it is noted that the male PIN element has a convex shape, so that, near the top dead center, the volume inside the pre-chamber is the minimum possible.

Preferably, the side wall of the pre-chamber substantially comprises three sections: a first section, at the base, i.e. directly connected to the head H, of approximately cylindrical shape; a third portion, in which it is intended to fit the PIN, and a second connecting portion between the first and the third portion, such as to reduce a cross section of the pre-chamber by passing from the first to the third section. It is preferred to make the through openings in the second section, as this allows to obtain, by appropriately choosing the inclination of this section, an optimal orientation of the PTO through openings and therefore an optimal orientation of the flame front in the combustion chamber.

Also from the figures it is clear that part of the combustion chamber can be obtained in the same piston.

A perimeter groove TH is formed around the PIN male element which performs various functions:

Allows the perimeter wall of the pre-chamber to penetrate the upper part of the piston without any collisions;

It represents a significant part of the combustion chamber and the external side walls are shaped to accord the propagation of pressure waves resulting from the propagation of the flame from the openings PTO during ignition.

As described above, in fact, the pressure wave is intended to propagate back to generate the flow of gas shown in FIG. 4 which penetrates the pre-chamber.

Thanks to this effect, the implementation of a further ignition of the mixture is further advantageous.

Figure 9:
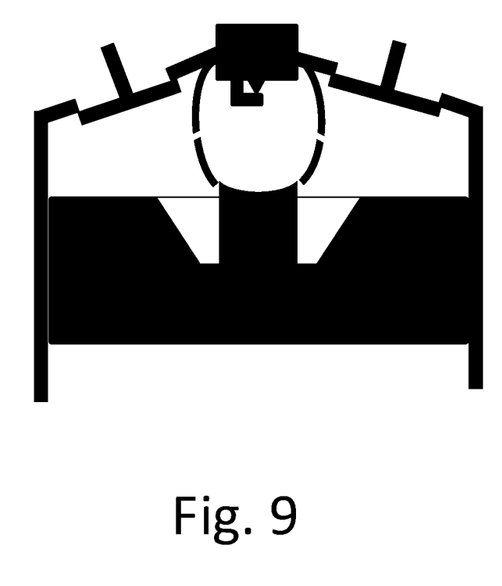
FIGS. 9-10 show variants of the engine of FIG. 1.

With reference to FIG. 9, the combustion chamber has a rounded bulb and the openings PTO are arranged and shaped so as to direct the outflow of ignited gas during the combustion phase of the mixture.

Figure 10:
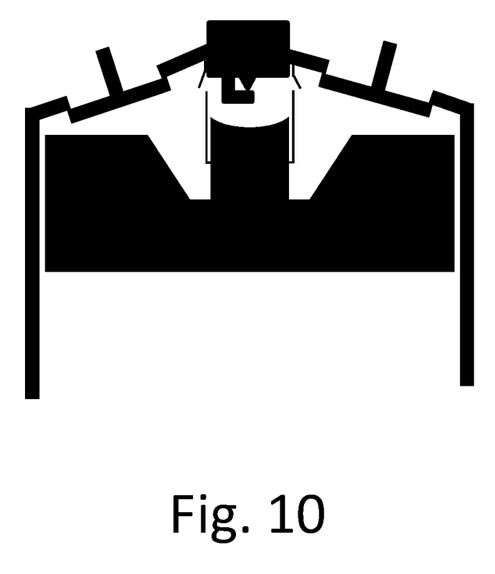

With reference to FIG. 10, the combustion chamber has a constant section throughout the development of the tubular shape. In this case, the orientation of the flame front is achieved by means of a conical deflector fitted over the pre-chamber, which defines a sort of skirt.

It is evident that intermediate configurations can be obtained between those shown in FIGS. 1, 9, and 10, in relation, for example, to the dead volume that is to be obtained. In fact, thanks to the present invention, by optimizing the washing of the pre-chamber, it is possible to increase the dead volume to create internal EGR, with an appropriate control of the exhaust valves and also, possibly, with external EGR, i.e. recirculation of exhaust gas between the exhaust manifold and the intake manifold.

The solution of FIGS. 1-8 are advantageous because the tubular element can be removed from the same opening in the head dedicated to the spark plug. In other words, the spark plug and the tubular element are interconnected before being inserted and screwed into the engine head.

The solution of FIGS. 9 and 10, on the other hand, allow to separate the tubular element from the head only when the head is disassembled from the relative cylinder.

Implementation variants of the described non-limiting example are possible, without however departing from the scope of the present invention, including all the equivalent embodiments for a person skilled in the art, to the content of the claims.

From the above description, the person skilled in the art is able to realize the object of the invention without introducing further construction details.

The invention claimed is:

1. A positive ignition internal combustion engine comprising:

a cylinder, wherein, a piston reciprocating and coupled with the cylinder, and a cylinder head to operationally define a combustion chamber between the cylinder and the cylinder head;

a spark plug;

a pre-chamber made at least partially inside the combustion chamber, wherein, the pre-chamber is confined by a longitudinal and tubular shaped female element, projects into the combustion chamber and comprises a first end stably connected to the cylinder head and a second end opposite to the first end; and a male element of longitudinal shape, wherein the male element is complementary and coaxial with the longitudinal and tubular shaped female element, and the male element is arranged to make a seal with the longitudinal and tubular shaped female element to pre-compress a mixture, wherein the male element comprises a first end and a second end, wherein the first end is stably connected to an upper surface of the piston to penetrate the longitudinal and tubular shaped female element and the second end is at least in a portion of a relative motion of the piston in the cylinder;

wherein the spark plug is arranged to project in the pre-chamber;

the longitudinal and tubular shaped female element includes through openings arranged in a perimeter to remain crossable in any relative position of the male element with respect to the longitudinal and tubular shaped female element; and when the piston is moving towards a top dead center, a pressure in the pre-chamber is greater than a pressure in the remaining combustion chamber.

2. The positive ignition internal combustion engine according to claim 1, wherein the second end of the longitudinal and tubular shaped female element has a tolerance with respect to transverse dimensions of the male element for making a seal during an approaching movement of the piston to a top dead center.

3. The positive ignition internal combustion engine according to claim 1, wherein at least in a relative position of the piston with respect to the cylinder, the male element is completely extracted and spaced from the second end of the longitudinal and tubular shaped female element.

4. The positive ignition internal combustion engine according to claim 1, wherein the through openings are arranged to direct a flow of gas and flame inside the combustion chamber during a burning phase of the mixture.

5. The positive ignition internal combustion engine according to claim 4, wherein the through openings are arranged to cause an ignition at half a distance between a center of the combustion chamber and a side wall of the cylinder.

6. The positive ignition internal combustion engine according to claim 1, wherein an end of the male element faces the pre-chamber and has a convex shape.

7. The positive ignition internal combustion engine according to claim 6, wherein a convexity of the end of the male element has a complementary shape with the spark plug.

8. The positive ignition internal combustion engine according to claim 2, wherein the through openings and the tolerance between the male element and the longitudinal and tubular shaped female element are sized to generate a pressure difference between the pre-chamber and the combustion chamber during a relative movement between the male element and the longitudinal and tubular shaped female element, and to generate a sudden circulation of gas between the pre-chamber and the combustion chamber.

9. The positive ignition internal combustion engine according to claim 1, wherein the cylinder head comprises at least one intake valve, at least one exhaust valve, and relative valve actuation means, and wherein the relative valve actuation means are configured to carrying out a scavenging procedure between the at least one intake valve and the at least one exhaust valve, and wherein at least one through opening is arranged in front of the at least one intake valve.

10. The positive ignition internal combustion engine according to claim 1, further comprising an intake manifold and a natural gas injection means inside the intake manifold or inside the cylinder.

11. The positive ignition internal combustion engine according to claim 2, further comprising an intake manifold and natural gas injection means inside the intake manifold or inside the cylinder.

12. The positive ignition internal combustion engine according to claim 3, further comprising an intake manifold and natural gas injection means inside the intake manifold or inside the cylinder.

13. The positive ignition internal combustion engine according to claim 4, further comprising an intake manifold and natural gas injection means inside the intake manifold or inside the cylinder.

14. The positive ignition internal combustion engine according to claim 5, further comprising an intake manifold and natural gas injection means inside the intake manifold or inside the cylinder.

15. The positive ignition internal combustion engine according to claim 6, further comprising an intake manifold and natural gas injection means inside the intake manifold or inside the cylinder.

16. The positive ignition internal combustion engine according to claim 7, further comprising an intake manifold and natural gas injection means inside the intake manifold or inside the cylinder.

17. The positive ignition internal combustion engine according to claim 8, further comprising an intake manifold and natural gas injection means inside the intake manifold or inside the cylinder.

18. The positive ignition internal combustion engine according to claim 9, further comprising an intake manifold and natural gas injection means inside the intake manifold or inside the cylinder.

19. The positive ignition internal combustion engine according to claim 2, wherein at least in a relative position of the piston with respect to the cylinder, the male element is completely extracted and spaced from the second end of the longitudinal and tubular shaped female element.

20. The positive ignition internal combustion engine according to claim 2, wherein the through openings are arranged to direct a flow of gas and flame inside the combustion chamber during a burning phase of the mixture.

* * * * *